(12) United States Patent
Adragna et al.

(10) Patent No.: US 7,149,068 B2
(45) Date of Patent: Dec. 12, 2006

(54) CIRCUIT FOR CONTROLLING THE MINIMUM OPERATING VOLTAGE OF SWITCHING POWER SUPPLY

(75) Inventors: Claudio Adragna, Monza (IT); Mauro Fagnani, Nerviano (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 155 days.

(21) Appl. No.: 10/824,630

(22) Filed: Apr. 14, 2004

(65) Prior Publication Data

US 2005/0001601 A1    Jan. 6, 2005

(30) Foreign Application Priority Data

Apr. 14, 2003    (EP) .................................. 03425232

(51) Int. Cl.
H02H 3/24 (2006.01)
H02H 7/00 (2006.01)
H02M 1/00 (2006.01)

(52) U.S. Cl. ............................ 361/92; 323/901; 381/18
(58) Field of Classification Search ................ 323/901
See application file for complete search history.

(56) References Cited

U.S. PATENT DOCUMENTS 5,757,635 A    5/1998    Seong

| | | | |
|---|---|---|---|
| 5,861,737 A * | 1/1999 | Goerke et al. | 323/282 |
| 6,381,151 B1 | 4/2002 | Jang | |
| 6,597,221 B1 * | 7/2003 | Hall et al. | 327/175 |
| 6,841,977 B1 * | 1/2005 | Huang et al. | 323/224 |
| 2002/0166073 A1 | 11/2002 | Nguyen et al. | |

OTHER PUBLICATIONS

European Search Report dated Sep. 25, 2003 for European Application No. 03-4252320.0.

* cited by examiner

*Primary Examiner*—Karl Easthom
*Assistant Examiner*—Harry R Behm
(74) *Attorney, Agent, or Firm*—Lisa K. Jorgenson; Stephen Bongini; Fleit, Kain, Gibbons, Gutman, Bongini & Bianco P.L.

(57) ABSTRACT

A circuit is provided for controlling a minimum operating voltage of an integrated control circuit of a switching power supply. The circuit includes at least one switch for switching the minimum operating voltage from a first voltage value to a second voltage value under conditions of low or null load of the switching power supply, and for switching the minimum operating voltage from the second voltage value to the first voltage value if the load of the switching power supply is greater than a predetermined load and the supply voltage is greater than the first voltage value. The minimum operating voltage can assume at least the first voltage value and the second voltage value, and the first voltage value is greater than the second voltage value. Also provided is a method for controlling a minimum operating voltage of an integrated control circuit of a switching power supply.

20 Claims, 3 Drawing Sheets

US 7,149,068 B2

CIRCUIT FOR CONTROLLING THE MINIMUM OPERATING VOLTAGE OF SWITCHING POWER SUPPLY

CROSS-REFERENCE TO RELATED APPLICATIONS

This application is based upon and claims priority from prior European Patent Application No. 03-425232.0, filed Apr. 14, 2003, the entire disclosure of which is herein incorporated by reference.

BACKGROUND OF THE INVENTION

1. Field of the Invention

The present invention relates to switching power supplies and integrated circuits for controlling such power supplies, and more particularly to a circuit for controlling the minimum operating voltage of the integrated control circuit of a switching power supply.

2. Description of Related Art

A common necessity to all switching power supplies is to stop its operation when the supply voltage of the integrated control circuit of the power supply is too low.

In fact, the control and, above all, the driving of the power switching element (almost always an N channel enrichment MOSFET) requires that the voltage that supplies the integrated control circuit is higher than a minimum value so that not only the internal circuits of the integrated device are adequately supplied but also that the voltage supplied to the gate terminal is such that the MOSFET is fully turned on. An attempt to operate below such a minimum value often causes the MOSFET to break because of the driving conditions that cause it to operate in the linear zone rather than in the ohmic zone.

Additionally, it is preferred to delay the start of operation of the integrated control circuit from the moment at which the input voltage is applied to the power supply. Besides realizing a well defined system startup sequence, this is absolutely necessary in some cases.

In network power supplies, during startup, there is a very elevated current pulse absorption due to the fact that such systems have at input a bridge rectifier followed by a filter capacitor that, initially, is uncharged and operates as a short circuit until it has been charged. To avoid the current reaching dangerous values for the bridge diodes and the filter capacitor, some current limitation means are set (for example, a resistance). However, because they are dissipating, they must be disconnected once they are not necessary any more. Therefore, it is advantageous to use a controlled switch placed in parallel with the limitation element, which is initially open and is closed as soon as the power supply starts its operation so as to be short-circuited. It is therefore necessary to introduce a delay at the start of operation of the integrated control circuit so as to assure that it starts when the input capacitor charging transient is ended.

For all these reasons the integrated control circuits are normally provided with the function known as Undervoltage Lockout (UVLO).

A schematic of part of a conventional integrated control circuit of a switching power supply is shown in FIG. 1. The network voltage Vac is applied through the activation of a switch SW to a diode bridge 10 and a filter capacitor Cf. The voltage Vin, which is provided across the terminals of the capacitor Cf, is applied to the startup circuit 11. The startup circuit 11, which is constituted by a resistance in the simplest case, provides a current Is that charges a second capacitor Cs. To the second capacitor Cs there is also applied a voltage coming from a secondary Wa of the power supply transformer, through a resistance R and a diode D. A fraction Iq of the current Is supplies the integrated control circuit 12. It is applied both to the UVLO circuit 13, and to the power supply driving circuit 14 that provides the control voltage Vg to the power switching element. The UVLO circuit 13 includes a comparator 15 with hysteresis that compares the supply voltage Vcc of the UVLO circuit 13 with a starting voltage Vss. The output voltage of the comparator 15 controls a controlled switch SW1 that opens or closes the supply of the driving circuit 14. The voltage Vin is the voltage that is applied to the power switching element of the power supply.

The network voltage Vac is applied to the power supply by closing the switch SW so that the filter capacitor Cf is charged, in a few milliseconds, to the network peak voltage, so as to originate the voltage Vin.

The startup circuit 11 provides a current Is that partly charges the capacitor Cs, while another part Iq is absorbed by the integrated control circuit 12. The absorption Iq of the integrated control circuit 12 under these conditions is very small because the UVLO circuit 13 maintains the switch SW1 open. The current provided by the startup circuit 11 therefore goes, for the greatest part, to charge the capacitor Cs, so as to increase the voltage Vcc provided across its terminals.

The voltage Vcc continues rising until it reaches the starting value Vss, in a variable time usually from some hundreds of milliseconds to some seconds. During this whole time the driving circuit 14 is turned off, and its output voltage Vg, which is used for driving the MOSFET gate, remains zero. As soon as the voltage Vcc reaches the voltage Vss, the comparator 15 closes the switch SW1, so that the current Iq considerably increases; the driving circuit of the MOSFET is enabled and the activity of the power supply begins.

The increased consumption of the device is not sustained by the startup circuit 11 so there is a quick decrease in Vcc. This is the reason that the comparator of the UVLO circuit 13 is provided with hysteresis. To turn off the driving circuit 14 and go back to the conditions before startup, it is necessary that Vcc drops below a second threshold Vstop that is less than Vss. Without this hysteresis a continuous alternation of turning on and turning off would be experienced.

In the meantime, because of the MOSFET switching, the output voltage of the power supply increases quickly together with the voltage, which is proportional to it, generated by the winding Wa, which is coupled to the transformer driven by the MOSFET. The winding Wa, the resistance R, the diode D, and the capacitor Cs form a circuit commonly known as the self supply circuit, to which the assignment of sustaining the operation of the integrated circuit is submitted. The number of turns of the winding Wa are opportunely chosen so that the voltage produced is higher than Vstop, and the capacitor Cs is opportunely chosen so that the voltage produced by the winding Wa becomes higher than the voltage Vstop before the voltage Vcc becomes smaller than the voltage Vstop.

The presence of the threshold voltage Vstop also assures a defined and sure operation during the turning off phase. In fact, by opening the switch SW the power supply is supplied at the expense of the charge present on the capacitor Cf, so that its voltage quickly drops. As soon as this voltage becomes insufficient to maintain the power supply active with the current load, the output voltage and, with it Vcc, quickly decrease and go down below the voltage Vstop. As soon as this happens the driving circuit 14 is turned off, Iq returns to its very low initial value, Vg goes to zero, and the MOSFET turns off.

Ideally, the voltage provided by the winding Wa, present across the terminals of the capacitor Cs, is hooked through the coil ratio of the transformer to the output controlled voltage, and it is therefore maintained controlled by the control system. In actual operation this result is almost true when the power supply input voltage varies, but the situation is very different when the load varies.

This is mainly due to the parasitic parameters of the transformer, because of which at high load the voltage goes up a lot more than expected because of the peaks present on the positive leading edges of the voltage on Wa, while at low or null load, where the peaks are extremely lower and the load on Wa represented by the integrated control circuit 12 can also be higher than at output, the voltage decreases notably below the expected value.

In the most modern integrated control circuits 12, this is emphasized by the adoption of some special techniques aimed at minimizing the power supply consumption at low loads so as to facilitate conformity with the most recent regulations regarding the consumption reduction of equipment under non-operating conditions (for example, EnergyStar, Energy2000, Blue Angel, and the like). Such techniques involve, substantially, the reduction of the power supply operating frequency at low or null load, so that the energy that Wa is able to transfer is decreased.

Another problem is represented by the fact that the voltage Vcc cannot overcome a set value Vccmax for reasons related to the technology of the integrated control circuit 12 that impose some limits on the voltage applied to it and, at the same time, under conditions of low or null load, Vcc has to maintain itself higher than Vstop, or the system will operate intermittently. Therefore, the variations of the voltage produced by Wa have to be contained, with some safety margin, within the interval Vstop–Vccmax.

To subsequently complicate the panorama, the requirement that the voltage produced by Wa, under short circuit conditions at the output of the power supply, should be lower than the voltage Vstop, is also added. So an intermittent operation is obtained that limits the power in use to non-dangerous values for the system integrity. It is understood from the description above that under short circuit conditions the peaks produced on Wa are particularly elevated and can be sufficiently energetic to sustain the voltage Vcc above Vstop, where, ideally, the voltage generated by Wa should be near zero.

To contain the phenomenon of a too high voltage at a maximum load and to assure the intermittent operation under short circuit conditions, and further to optimize the constructive formalities of the transformer, usually the resistance R in series with the diode D is used to round off the peaks. Sometimes, a small coil is alternatively used. Nevertheless, both solutions stress the decreasing of Vcc at low or null load. Also, by optimizing the value of such resistor or coil (that is, using the minimum value) so as to assure operation under safety conditions both at maximum load (Vcc<Vccmax) and at short circuit (Vcc<Vstop), it is hardly possible to satisfy the condition Vcc>Vstop at low or null load. To solve this last problem some ballast loads at the power supply output are then added so as to contrast the decreasing of Vcc. This, however, worsens the system efficiency and, above all, it practically makes it impossible to satisfy the various regulations (such as EnergyStar, Energy2000, Blue Angel, and so on).

The same drawbacks also occur with other external circuital solutions that are used to minimize the peak effect. In all of them, satisfying the conditions Vcc<Vccmax at full load and Vcc<Vstop in short circuit makes it extremely difficult to also satisfy the condition Vcc>Vstop at minimum or null load.

SUMMARY OF THE INVENTION

In view of these drawbacks, it is an object of the present invention to provide an integrated control circuit of a switching power supply that does not have these drawbacks.

Another object of the present invention is to provide a circuit for controlling the minimum operating voltage of the integrated control circuit of a switching power supply.

One embodiment of the present invention provides a circuit for controlling a minimum operating voltage of an integrated control circuit of a switching power supply. The circuit includes at least one switch for switching the minimum operating voltage from a first voltage value to a second voltage value under conditions of low or null load of the switching power supply, and for switching the minimum operating voltage from the second voltage value to the first voltage value if the load of the switching power supply is greater than a predetermined load and the supply voltage is greater than the first voltage value. The minimum operating voltage can assume at least the first voltage value and the second voltage value, and the first voltage value is greater than the second voltage value.

Another embodiment of the present invention provides a method for controlling a minimum operating voltage of an integrated control circuit of a switching power supply having a supply voltage. According to the method, the minimum operating voltage is switched from a first voltage value to a second voltage value under conditions of low or null load of the switching power supply, and the minimum operating voltage is switched from the second voltage value to the first voltage value if the load of the switching power supply is greater than a predetermined load and the supply voltage is greater than the first voltage value. The first voltage value is greater than the second voltage value.

The present invention is applicable to various types of power supplies, for example to circuits for the active power factor correction (PFC), to pulse width modulation circuits (PWM), and to resonant and almost resonant converter circuits.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

The maximum voltage Vccmax applied to the integrated control circuit is limited by technological constraints and therefore must be defined by bringing it to the highest values allowed by the technology used. The present invention adapts the threshold Vstop of the UVLO circuit to the operating conditions of the power supply: a smaller value than the predetermined value at low or null load so as to facilitate the satisfaction of the condition Vcc>Vstop, and preferably a higher value than the predetermined value under short circuit conditions so as to facilitate the satisfaction of the condition Vcc<Vstop.

However, the voltage Vstop must always be maintained within the safety limits for a correct driving of the power MOSFET. Nevertheless at low load it is acceptable to provide a lower voltage than that provided under normal operating conditions to the MOSFET gate (for example, 7V instead of 10V). In fact, the resulting light increase in the conduction resistance of the MOSFET does not have a meaningful impact on its power dissipation, since under those conditions the passing-through current is very low and the duration of its conduction is very small compared with the time that intervenes between two periods of consecutive conduction.

Figure 1:
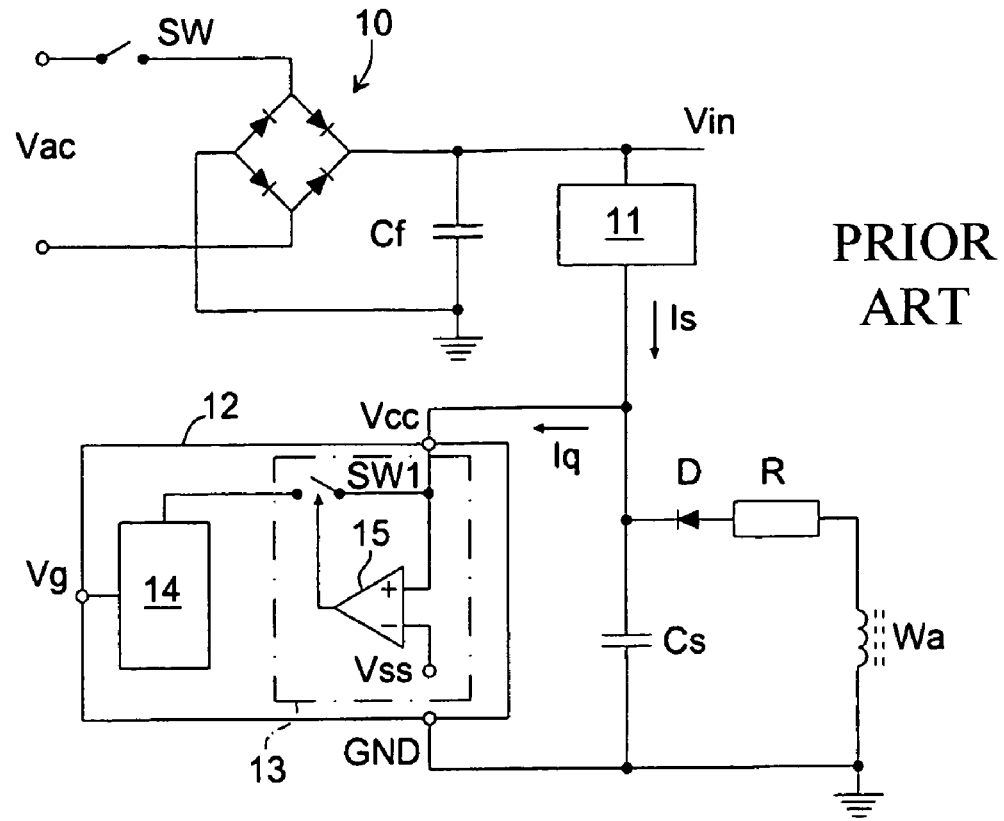
FIG. 1 shows a schematic of part of a conventional integrated control circuit of a switching power supply.
Figure 2:
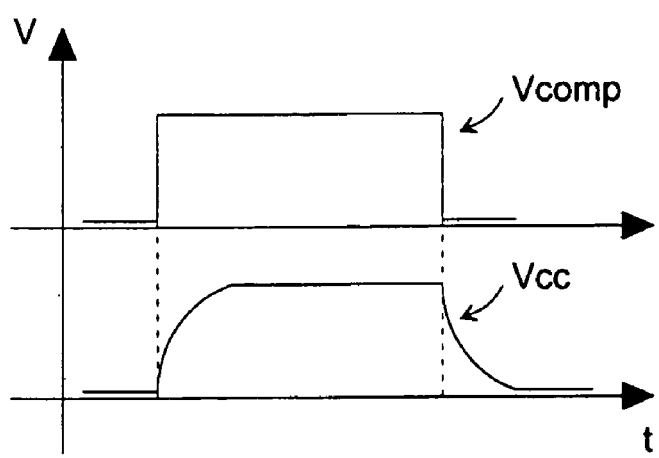
FIG. 2 shows the course of the voltage Vcc and the voltage Vcomp at the varying of the load.

FIG. 2 represents the trend of the voltage Vcc and the voltage Vcomp at the varying of the load. The voltage Vcomp is the voltage at the output of an error amplifier of the integrated control circuit used in the power supply and is commonly known as the "control voltage", because it controls the power supply by determining the turn on and turning off timing values of the power supply power switching element. The voltage, within the limits of its dynamics, is proportional to the load applied to the power supply and therefore it is assumed as an indicative signal of the load conditions. Alternatively, other voltages indicative of the output load conditions of the power supply can be used.

Following the increasing of the load, the voltage Vcomp quickly climbs so as to restore the temporary decrease in the output voltage of the power supply consequent to the increased request for power. The voltage Vcc increases accordingly but, because of the transformer parasitic elements and the filtering effect of the resistance R, this happens with notable delay with respect to the level change of the control voltage.

Following the decreasing of the load, the voltage Vcomp quickly goes down so as to adjust the power supply to the reduced energy request of the load and to correct the resulting temporary increase in the output voltage. Also in this case, the level of the voltage Vcc, corresponding to the new load condition, is reached with notable delay with respect to the variation of the voltage Vcomp.

Figure 3A:
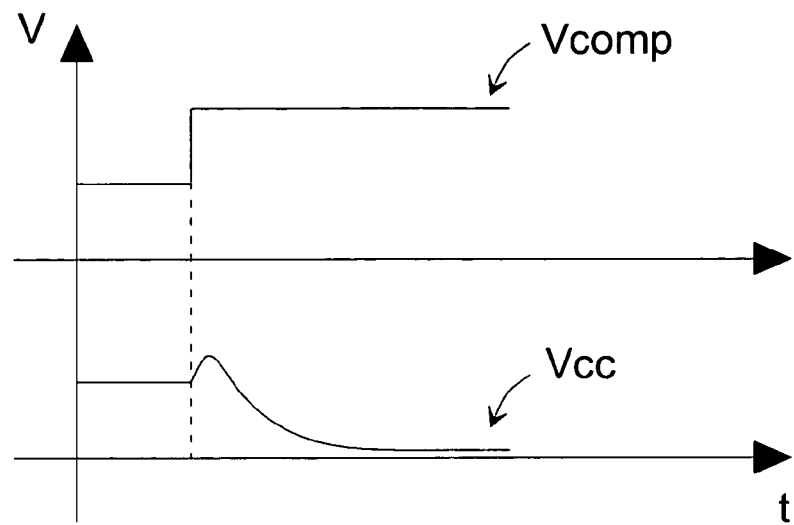
FIG. 3a shows the trend of the voltage Vcc and the voltage Vcomp when a short circuit is applied at the power supply output.
Figure 3B:
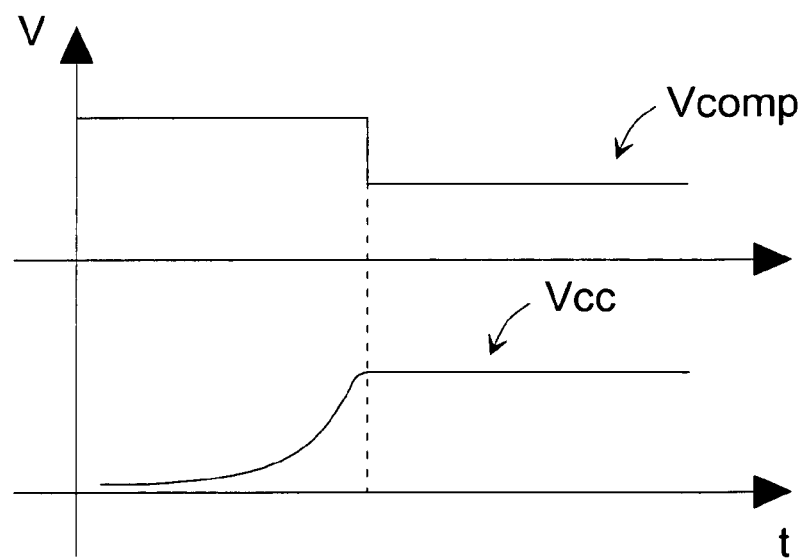
FIG. 3b shows the trend of the voltage Vcc and the voltage Vcomp at the removal of a short circuit at the power supply output.

FIG. 3a shows the trend of the voltage Vcc and the voltage Vcomp at the application of a short circuit to the power supply output, and FIG. 3b shows the trend of the voltage Vcc and the voltage Vcomp at the removal of a short circuit at the power supply output.

Following the application of the short circuit, after a first short part in which the voltage Vcc tends to increase, there is a slow decrease toward lower values. Again in this case Vcc is delayed with respect to Vcomp. At the removal of the short circuit (with the hypothesis that Vcc has not gone below Vstop and therefore the integrated control circuit has always been turned on), Vcc goes up again toward the normal operating value in advance with respect to Vcomp. This is explained by the fact that the power supply output voltage during the short circuit was far below the regulated value and Vcomp stays high until such voltage, and therefore Vcc also, is returned to approximately the regulated value.

Figure 4:
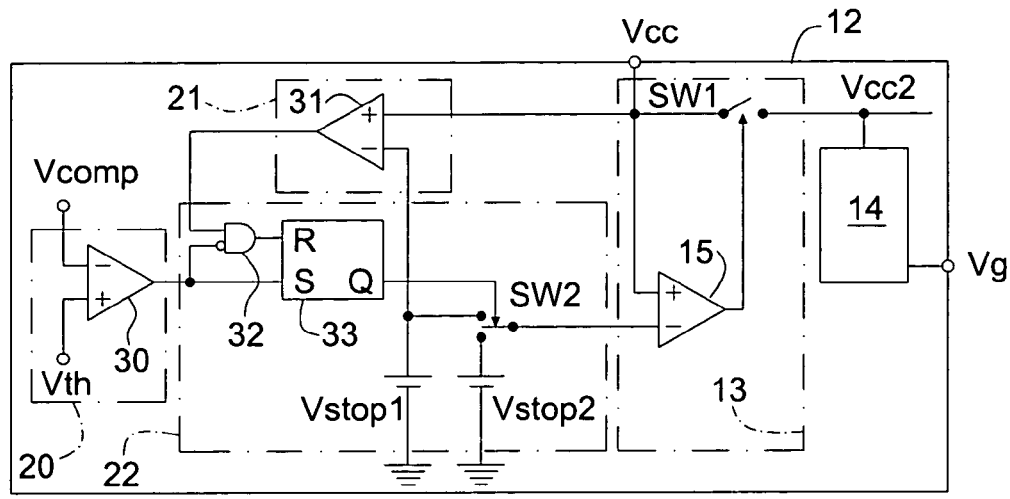
FIG. 4 shows a schematic of part of an integrated control circuit of a switching power supply according to a first embodiment of the present invention.

FIG. 4 shows a schematic of part of an integrated control circuit of a switching power supply according to a first embodiment of the present invention. The control circuit comprises a control system 20 of the voltage Vcomp, a control system 21 of the voltage Vcc, and a processing system 22. The processing system 22 receives at input the information provided by the control systems 20 and 21, and changes the value Vstop according to a predetermined rule, so as to satisfy the conditions Vcc<Vccmax at full load and Vcc<Vstop in short circuit and Vcc>Vstop at minimum or null load.

The control system 20 of the voltage Vcomp receives at input the voltage Vcomp and a threshold voltage Vth, effects a comparison between such voltages, and provides its output to the processing system 22. The control system 21 of the voltage Vcc receives at input the voltage Vcc and a voltage Vstop, effects a comparison between such voltages, and provides its output to the processing system 22.

In this embodiment, the control system 20 of the voltage Vcomp is formed by a comparator 30, which is preferably equipped with hysteresis for a higher noise immunity, that receives at its inverting input the voltage Vcomp and at its non-inverting input the voltage Vth. The control system 21 of this embodiment is formed by another comparator 31 that receives at its inverting input the reference voltage Vstop1 and at its non-inverting input the voltage Vcc. In this embodiment, the processing system 22 includes an AND circuit 32 that receives at one input the output voltage of the comparator 31, and at the other input the inverted output voltage of the comparator 30. The output voltage from the comparator 30 is also applied to the S input of an RS flip flop 33. The output of the AND circuit 32 is applied to the R input of the RS flip flop 33. The output Q of the RS flip flop 33 controls a switch SW2 (selection circuit) that switches between reference voltages Vstop1 and Vstop2 for provision to the inverting input of a comparator 15. The voltage Vstop1 is higher than the voltage Vstop2.

The function realized by this circuit is to decrease the threshold voltage of the UVLO circuit 13 from the predetermined value Vstop1 to the value Vstop2, which is less than Vstop1, when the voltage Vcomp is lower than the voltage value Vth (indicating that the load at the power supply output is lower than a given value), and to bring it to the original value Vstop1 when the voltage Vcomp is higher than the voltage value Vth (or another slightly higher value due to the possible presence of the hysteresis) and Vcc is higher than Vstop1.

When Vcomp<Vth, the comparator 30 provides a high level to the S input of the RS flip flop 33 so as to set high its output Q and switch the switch SW2 to Vstop2. Since the threshold of the UVLO circuit 13 is lowered and Vcc delays with respect to Vcomp, as shown in FIG. 2, the transition of such threshold cannot cause any trouble.

Nevertheless the return of the threshold of the UVLO circuit 13 from Vstop2 to Vstop1 cannot be controlled by the same comparator 30. Keeping in mind FIG. 2, it is supposed, as it is probable, that at minimum load the voltage Vcc goes toward a value between Vstop1 and Vstop2. In case of a sudden increasing of load that makes Vcomp>Vth (or Vth plus the hysteresis), Vcc is delayed by different milliseconds and would be below Vstop1 and the integrated circuit would turn off. It is therefore necessary to condition the restoration of the old threshold Vstop1 not only on the condition Vcomp>Vth but also on Vcc>Vstop1. This is realized by the AND gate 32 that provides the reset to the R input of the RS flip flop 33, and brings low its output Q by switching SW2 to Vstop1.

Figure 5:
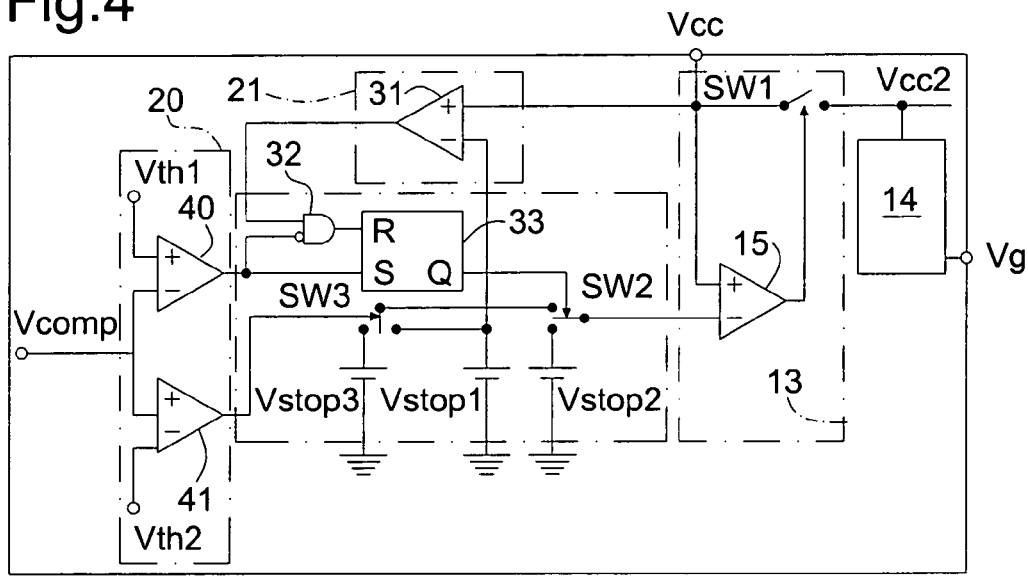
FIG. 5 shows a schematic of part of an integrated control circuit of a switching power supply according to a second embodiment of the present invention.

FIG. 5 shows a schematic of part of an integrated control circuit of a switching power supply according to a second embodiment of the present invention. With respect to the embodiment of FIG. 4, the embodiment of FIG. 5 differs in that the control system 20 of the voltage Vcomp is formed by a first comparator 40, preferably provided with hysteresis for a higher noise immunity, that receives at its inverting input the voltage Vcomp and at its non-inverting input the voltage Vth1, and by a second comparator 41, preferably equipped with hysteresis for a higher noise immunity, that receives at its non-inverting input the voltage Vcomp and at its inverting input the voltage Vth2. The output of the first comparator 40 is applied to the S input of the RS flip flop 33, and is applied inverted to the input of the AND circuit 32. The output of the second comparator 41 controls a switch SW3 that switches between reference voltages Vstop3 and Vstop1 for provision to a terminal of the switch SW2. At the other terminal of the switch SW2, the reference voltage Vstop2 is applied. The switches SW2 and SW3 form a selection circuit.

In addition to the function realized by the circuit of FIG. 4, this circuit increases the threshold of the UVLO circuit 13 from the predetermined value Vstop1 to the value Vstop3, which is greater than Vstop, when the voltage Vcomp is higher than the value Vth2 (indicating that the power supply is overloaded or in short circuit), and brings it to the original value Vstop1 when the overload or short circuit condition is removed.

The simple comparator with a reference voltage Vth is replaced by a window comparator in which the threshold voltage Vth1 corresponds to the voltage Vth of the circuit of FIG. 4 while the voltage Vth2 (which is greater than Vth1) represents the maximum value of Vcomp for which the power supply is still in voltage regulation, or the minimum value of Vcomp that indicates an overload or a short circuit at the output of the power supply. In the case of Vcomp<Vth1, there is exactly the same operation as described above for the circuit of FIG. 4.

When Vcomp>Vth2, the comparator that perceives this condition switches the switch SW3 to Vstop3 (obviously, if Vcomp>Vth2 there is also Vcomp>Vth1, so the output Q is high and SW2 is switched to Vstop1). In such a case, with a delay on the order of some tenths of milliseconds, as shown in FIG. 3a, presumably the voltage Vcc will go down below the threshold causing the turning off of the integrated circuit and guarantying a sure operation of the power supply under short circuit conditions. There is therefore also the disposition of a temporal window during which, if the short circuit is removed, the turning off of the integrated circuit does not take place so as to provide continuity service to the power supply in case of accidental short circuits of limited duration.

In this case the return of the threshold voltage of the UVLO circuit 13 from Vstop3 to Vstop1 is controlled by the same comparator. Keeping in mind FIG. 3b, if the short circuit were removed before Vcc<Vstop3, Vcc would set very near the normal operating value before Vcomp is returned under Vth2 and, therefore, SW3 has been brought on Vstop1.

Figure 6:
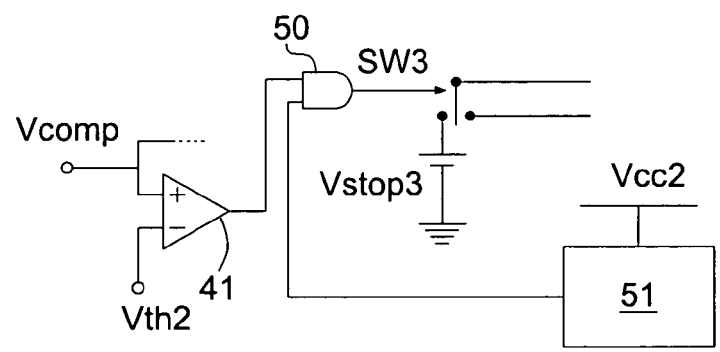
FIG. 6 shows a schematic of part of an integrated control circuit of a switching power supply according to another embodiment of the present invention.

FIG. 6 shows a schematic of part of an integrated control circuit of a switching power supply according to another embodiment of the present invention. This embodiment is similar to the embodiment of FIG. 5 but, as shown, differs in that the output of the second comparator 41, instead of directly controlling the switch SW3, is applied to another AND circuit 50, whose output controls the switch SW3. At the other input of the AND circuit 50 is applied the output of a delay circuit 51 that is supplied by the voltage Vcc2 that supplies the driving circuit 14 of the power supply.

The threshold voltage of the UVLO circuit 13 is moved from Vstop1 to Vstop3 when Vcomp>Vth2 provided that it is not during the startup phase of the power supply, during which the output voltage has to pass from zero to the regulated value and therefore there is a condition functionally analogous to a short circuit and, for a more or less long period, there is Vcomp>Vth2 in the absence of load anomalies. This implicates the presence of a signal that points out that the startup transient phase (that started at the moment in which Vcc>Vstart) is over. Such a signal can be produced by any delay circuit that is activated as soon as Vcc>Vstart, for example when the switch SW1 is closed and Vcc2 is supplied also to the block 51, and provides such a high level output voltage value to activate the AND circuit 50.

The present invention can be embedded in hardware, software, or a combination of hardware and software. Any processor, controller, or other apparatus adapted for carrying out the functionality described herein is suitable. A typical combination of hardware and software could include a general purpose microprocessor (or a controller) with a computer program that, when loaded and executed, carries out the functionality described herein.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A circuit for controlling a minimum operating voltage of an integrated control circuit of a switching power supply having a supply voltage, said circuit comprising:
    at least one switch for switching the minimum operating voltage from a first non-zero voltage value to a second non-zero voltage value under conditions of low or null load of the switching power supply, and for switching the minimum operating voltage from the second non-zero voltage value to the first non-zero voltage value if the load of the switching power supply is greater than a determined load and the supply voltage is greater than the first non-zero voltage value, wherein the minimum operating voltage can assume at least the first non-zero voltage value and the second non-zero voltage value, and the first non-zero voltage value is greater than the second non-zero voltage value.

2. The circuit according to claim 1, wherein the at least one switch switches the minimum operating voltage from the first non-zero voltage value to the second non-zero voltage value when a voltage proportional to the load of the switching power supply is less than a first reference voltage.

3. The circuit according to claim 1, wherein the at least one switch switches the minimum operating voltage from the second non-zero voltage value to the first non-zero voltage value when a voltage proportional to the load of the switching power supply is greater than a first reference voltage and the supply voltage is greater than the first non-zero voltage value.

4. An integrated circuit comprising the circuit according to claim 1.

5. A switching power supply comprising the integrated control circuit according to claim 4.

6. A circuit for controlling a minimum operating voltage of an integrated control circuit of a switching power supply having a supply voltage, said circuit comprising:

at least one switch for switching the minimum operating voltage from a first voltage value to a second voltage value under conditions of low or null load of the switching power supply, and for switching the minimum operating voltage from the second voltage value to the first voltage value if the load of the switching power supply is greater than a determined load and the supply voltage is greater than the first voltage value, wherein the minimum operating voltage can assume at least the first voltage value and the second voltage value, the first voltage value is greater than the second voltage value, the minimum operating voltage can also assume a third voltage value, the third voltage value is greater than the first voltage value, and the at least one switch switches the minimum operating voltage from the first voltage value to the third voltage value when a voltage proportional to the load of the switching power supply is greater than a second reference voltage.

7. The circuit according to claim 6, wherein the at least one switch switches the minimum operating voltage from the first voltage value to the third voltage value when a voltage proportional to the load of the switching power supply is greater than the second reference voltage and the switching power supply is already operating.

8. The circuit according to claim 6, further comprising:

a circuit that supplies a second supply voltage to a driving circuit of the switching power supply when the supply voltage overcomes the first voltage value, wherein the at least one switch switches the minimum operating voltage from the first voltage value to the third voltage value when a voltage proportional to the load of the switching power supply is greater than the second reference voltage and a delay has passed since the second supply voltage was supplied to the driving circuit.

9. A circuit for controlling a minimum operating voltage of an integrated control circuit of a switching power supply having a supply voltage, said circuit comprising:

a first comparator for comparing a control voltage and a first reference voltage;

a second comparator for comparing the supply voltage and a first non-zero voltage value; and a selection circuit coupled to the first and second comparators, the selection circuit switching the minimum operating voltage from the first non-zero voltage value to a second non-zero voltage value when the first comparator indicates that the control voltage is less than the first reference voltage, and switching the minimum operating voltage from the second non-zero voltage value to the first non-zero voltage value when the first comparator indicates that the control voltage is greater than the first reference voltage and the second comparator indicates that the supply voltage is greater than the first non-zero voltage value, wherein the first non-zero voltage value is greater than the second non-zero voltage value.

10. The circuit according to claim 9, wherein the control voltage is the control voltage of the switching power supply.

11. The circuit according to claim 9, wherein the control voltage is a voltage proportional to the load of the switching power supply.

12. An integrated circuit comprising the circuit according to claim 9.

13. A switching power supply comprising the integrated control circuit according to claim 12.

14. A circuit for controlling a minimum operating voltage of an integrated control circuit of a switching power supply having a supply voltage, said circuit comprising:

a first comparator for comparing a control voltage and a first reference voltage;

a second comparator for comparing the supply voltage and a first voltage value; and a selection circuit coupled to the first and second comparators, the selection circuit switching the minimum operating voltage from the first voltage value to a second voltage value when the first comparator indicates that the control voltage is less than the first reference voltage, and switching the minimum operating voltage from the second voltage value to the first voltage value when the first comparator indicates that the control voltage is greater than the first reference voltage and the second comparator indicates that the supply voltage is greater than the first voltage value, wherein the first voltage value is greater than the second voltage value, the selection circuit switches the minimum operating voltage from the first voltage value to a third voltage value when the control voltage is greater than a second reference voltage, and the third voltage value is greater than the first voltage value.

15. The circuit according to claim 14, wherein the selection circuit switches the minimum operating voltage from the first voltage value to the third voltage value only if the switching power supply is already operating.

16. The circuit according to claim 14 further comprising:

a circuit that supplies a second supply voltage to a driving circuit of the switching power supply when the supply voltage overcomes the first voltage value, wherein the selection circuit switches the minimum operating voltage from the first voltage value to the third voltage value only if a delay has passed since the second supply voltage was supplied to the driving circuit.

17. A method for controlling a minimum operating voltage of an integrated control circuit of a switching power supply having a supply voltage, said method comprising the steps of:
   switching the minimum operating voltage from a first non-zero voltage value to a second non-zero voltage value under conditions of low or null load of the switching power supply; and
   switching the minimum operating voltage from the second non-zero voltage value to the first non-zero voltage value if the load of the switching power supply is greater than a determined load and the supply voltage is greater than the first non-zero voltage value,
   wherein the first non-zero voltage value is greater than the second non-zero voltage value.

18. The method according to claim 17, wherein a condition of low or null load of the switching power supply is determined when a voltage proportional to the load of the switching power supply is less than a first reference voltage.

19. The method according to claim 17, wherein it is determined that the load of the switching power supply is greater than the determined load when a voltage proportional to the load of the switching power supply is greater than a first reference voltage.

20. A method for controlling a minimum operating voltage of an integrated control circuit of a switching power supply having a supply voltage, said method comprising the steps of:
   switching the minimum operating voltage from a first voltage value to a second voltage value under conditions of low or null load of the switching power supply
   switching the minimum operating voltage from the second voltage value to the first voltage value if the load of the switching power supply is greater than a determined load and the supply voltage is greater than the first voltage value; and
   switching the minimum operating voltage from the first voltage value to a third voltage value when a voltage proportional to the load of the switching power supply is greater than a second reference voltage, the third voltage value being greater than the first voltage value,
   wherein the first voltage value is greater than the second voltage value.

* * * * *